Oct. 7, 1952     H. KAUFMANN     2,612,795
APPARATUS FOR MANUFACTURING SLIDE FASTENERS
Filed June 2, 1949     5 Sheets-Sheet 1
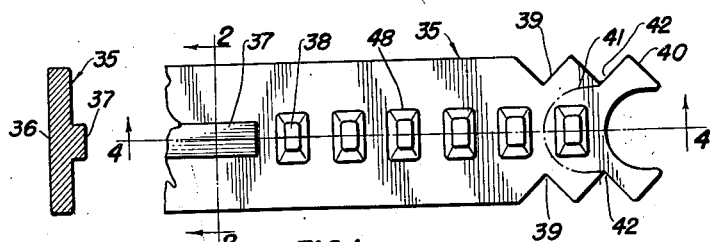
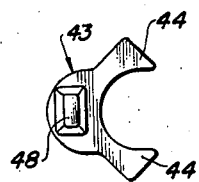
FIG. 2.     FIG. 1.     FIG. 7.
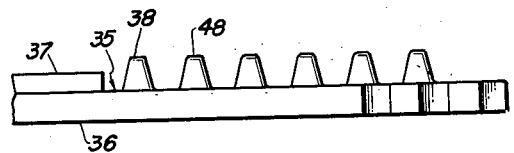
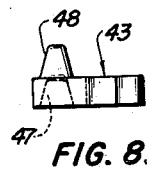
FIG. 3.     FIG. 8.
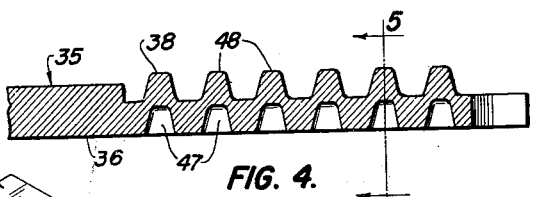
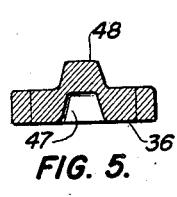
FIG. 4.     FIG. 5.
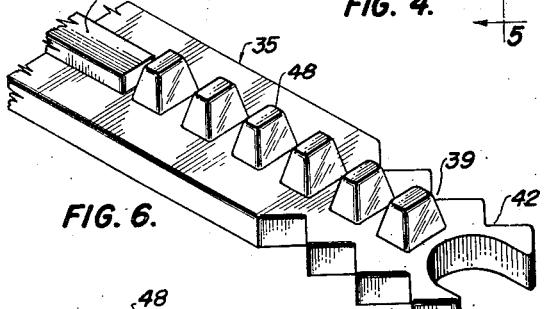
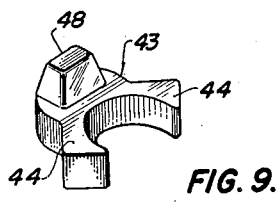
FIG. 6.     FIG. 9.
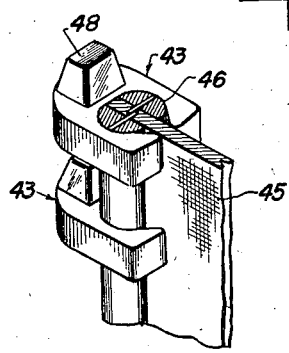
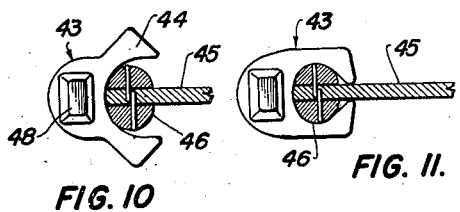
FIG. 12.     FIG. 10.     FIG. 11.
INVENTOR
HENRY KAUFMANN.
BY
ATTORNEY Oct. 7, 1952   H. KAUFMANN   2,612,795
APPARATUS FOR MANUFACTURING SLIDE FASTENERS
Filed June 2, 1949   5 Sheets-Sheet 2

INVENTOR
HENRY KAUFMANN
BY
ATTORNEY

Oct. 7, 1952          H. KAUFMANN          2,612,795
APPARATUS FOR MANUFACTURING SLIDE FASTENERS
Filed June 2, 1949          5 Sheets-Sheet 3
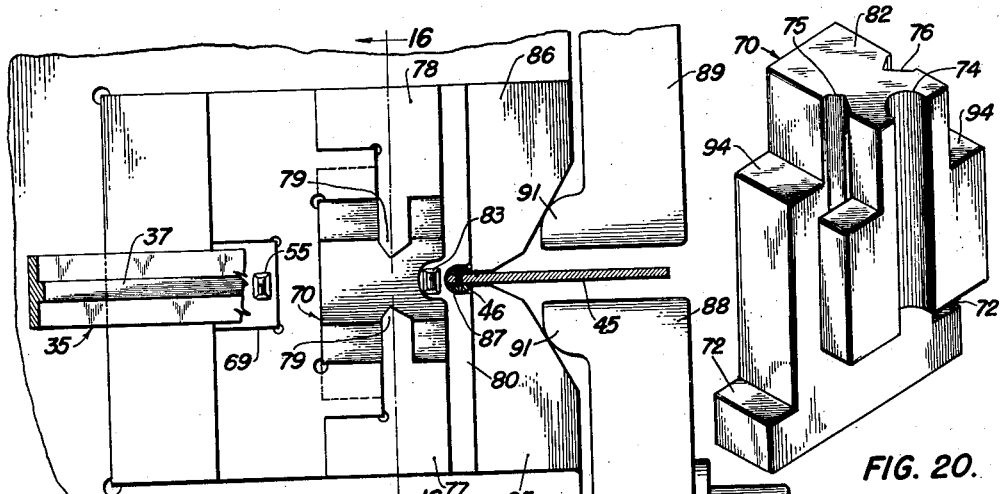
FIG. 20.
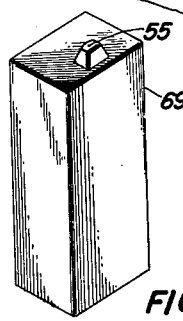
FIG. 19.
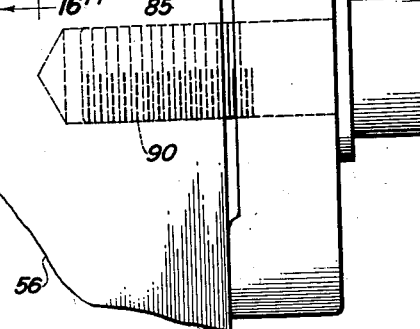
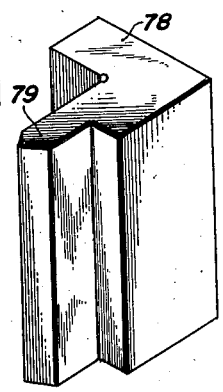
FIG. 21.
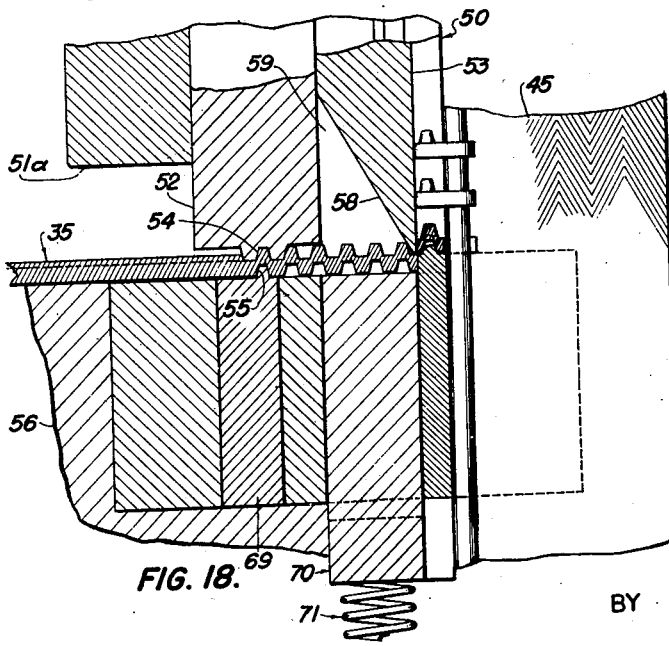
FIG. 23.
FIG. 18.
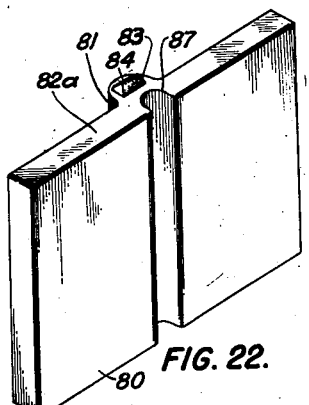
FIG. 22.
INVENTOR
HENRY KAUFMANN
BY
ATTORNEY

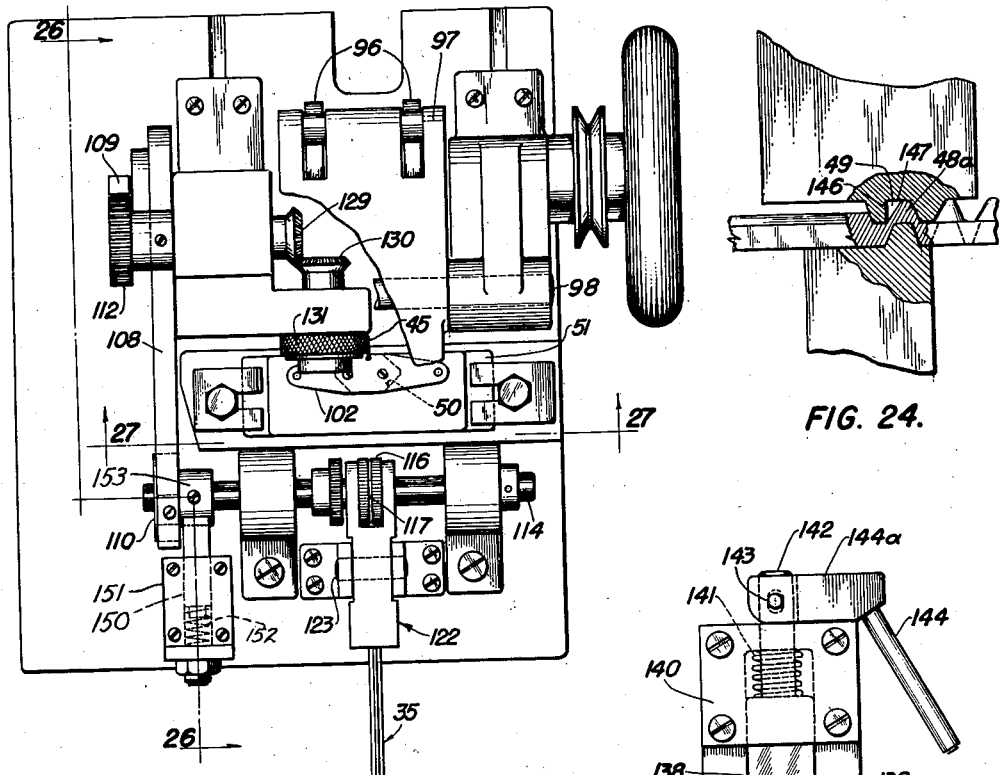
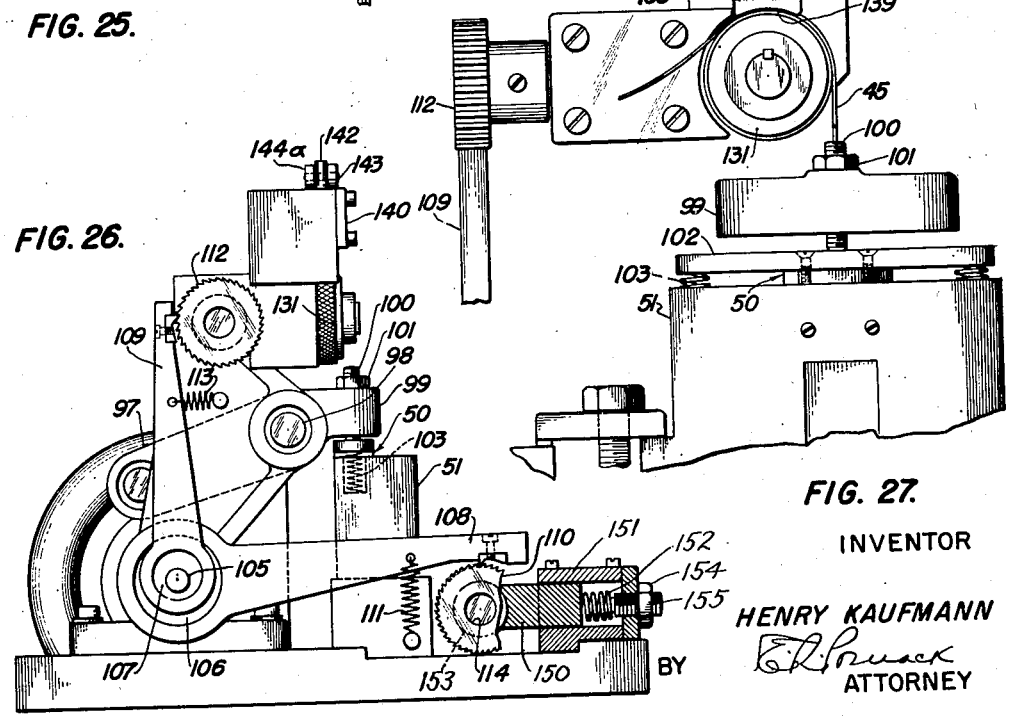
FIG. 25.
FIG. 24.
FIG. 26.
FIG. 27.
INVENTOR
HENRY KAUFMANN
BY
ATTORNEY Oct. 7, 1952          H. KAUFMANN          2,612,795

APPARATUS FOR MANUFACTURING SLIDE FASTENERS

Filed June 2, 1949          5 Sheets—Sheet 5

INVENTOR

HENRY KAUFMANN

BY          ATTORNEY

Patented Oct. 7, 1952

2,612,795

UNITED STATES PATENT OFFICE 2,612,795

APPARATUS FOR MANUFACTURING SLIDE FASTENERS

Henry Kaufmann, New York, N. Y., assignor to Star Fastener, Inc., New York, N. Y., a corporation of New York Application June 2, 1949, Serial No. 96,649

1 Claim. (Cl. 78—13)

This invention relates to slide fasteners and their manufacture.

It is primarily within my contemplation to provide an apparatus which, in combination with wire stock, will constitute an improvement over existing systems for fabricating slide fasteners, with respect to speed and cost of production, adjustability for different sizes of fastening elements, simplicity of apparatus components, and efficacy of the final product.

In many conventional slide fastener machines, the fastening elements produced thereby, which contain the male and female interlocking elements, do not effectuate sufficiently positive closures. This is frequently due to too shallow recesses for the female elements and correspondingly low male projections, as well as to poor definition of operative edges of the coacting locking elements. This shortcoming is particularly evident in those devices where embryo strips are produced by rolling processes. It is accordingly one of the objectives of the present invention to obviate these disadvantages by providing means to produce relatively deep cavities for the female elements, correspondingly higher projections for the male elements, and operative edges of greater definition than can be produced in most conventional devices operating on a mass production basis.

It is also known that in machines employing reciprocating die members, as distinguished from rolling means, for forming the male and female portions of the elements, the final products often have the same shortcoming of shallowness above referred to. This is due to the need to employ the shortest possible stroke within practical limits, since otherwise production may be interfered with by "air lock" during the formation of the cavity by the punch. It is my object to avoid this difficulty, even with the employment of reciprocating punch and die machine components in the production of the complementary male and female elements.

Conventional slide fastener machines which employ clinching methods to fasten the elements upon a tape are so designed that the tape must be held under tension, particularly to avoid overfeeding or excess movement of the tape. It is obvious that because of this tension, the speed of the tape, and consequently of the coactive machine elements, must be held within certain predetermined limits. Furthermore, considerable caution must be exercised in the selection of tape material, because weak material may be unable to stand the strain, and also because material of different stretching properties would require careful and at times difficult adjustments in the machine. It is accordingly another object of my invention to avoid this shortcoming by reducing the tension in the tape to a point where greater tape speed will be possible than in conventional apparatus—and whereby relatively weak tape, as well as tapes of different stretchability, can readily be employed with little or no inconvenience or danger.

A very common type of slide fastener apparatus employs a pressure pad which is coactive with a wire feeding mechanism. It has been found that with such machines it is a very difficult matter to make adjustments for producing fasteners with elements of different widths and pitches. To change from one-sized element to another requires not only changes in the punch and die mechanism, but also changes in the rollers for forming embryo strips, in the tape feeding mechanism, in the cams that operate on various feeds, and in other structural parts of the machine, so as frequently to make it more practical to employ different machines for different sizes of slide fastener elements than to make adjustments therein. It is hence an important object of my invention to eliminate this disadvantage and to facilitate the convertibility of a machine for the production of slide fasteners of different sizes. And in a preferred form of my invention, the only changes required, aside from clamps for clinching the elements to the tape, are in the dies (which in one stroke perform embossing, notch-cutting and severing steps), and in the ratchet mechanism for feeding the tape and wire.

It is a further object of this invention to provide separate adjustable and releasable brake means for the tape and wire-feeding mechanisms, entirely independent of the pressure pad but in cyclic relation thereto, said brakes being adapted to prevent overfeeding and slippage.

Still another object of this invention is to provide a coactive punch and die which is simple to fabricate and easier to operate than analogous conventional machine components.

Other objects, features and advantages will appear from the drawings and the description hereinafter given.

Referring to the drawings:

Fig. 1 is a plan view of a wire strip showing the male and female embossed portions, the cutout notches and the configuration of the foremost portion of the strip after an element had been severed therefrom, in accordance with the present invention.

Fig. 2 is a section of Fig. 1 taken along line

2—2 showing the shallow T-shape of the strip formed by my process and employed in combination with the apparatus to be hereinafter described.

Fig. 3 is a side view of Fig. 1.

Fig. 4 is a section of Fig. 1 taken along line 4—4.

Fig. 5 is a section of Fig. 4 along line 5—5.

Fig. 6 is a perspective of the strip of Figs. 1–5.

Fig. 7 is a plan view of an element severed from the foremost portion of the strip of Fig. 1, just prior to being clinched upon the tape.

Fig. 8 is a side view of Fig. 7.

Fig. 9 is a perspective of the element of Figs. 7 and 8.

Fig. 10 shows the element of Fig. 9 in engagement with a tape, just prior to the clinching thereof.

Fig. 11 shows the element of Fig. 10 operatively clinched upon the tape.

Fig. 12 is a perspective view of a tape like that of Fig. 11, with two elements shown operatively attached thereto.

Figure 13:
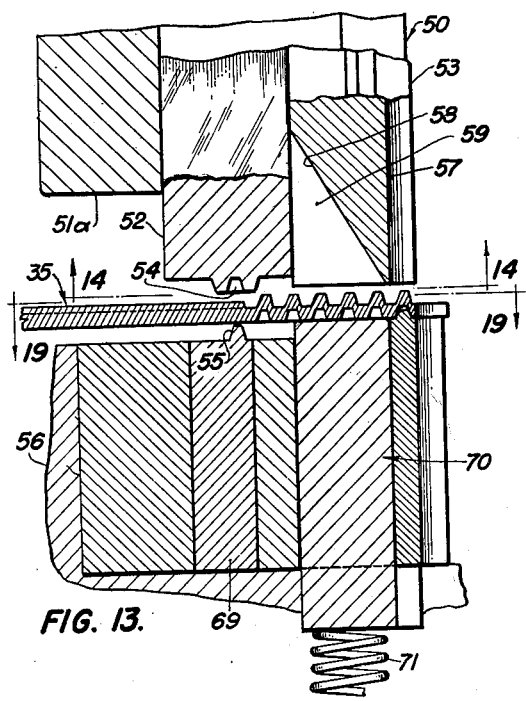

Fig. 13 is a fragmentary vertical section of the machine of my invention, taken through the cooperating punch and die components for performing embossing, notch-cutting and severing operations, showing a wire strip operatively in place, with the punch members in raised position and the pressure pad in its correspondingly elevated position.

Figure 14:
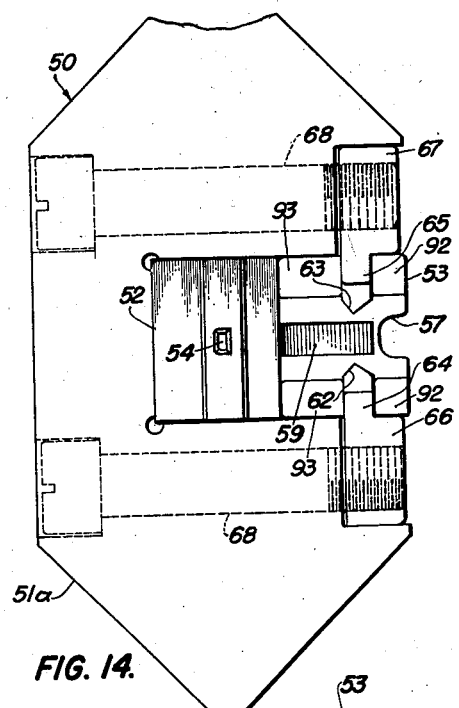

Fig. 14 is a bottom view of the punch housing and punch components, looking upwardly in the direction of arrows 14—14 of Fig. 13.

Figure 15:
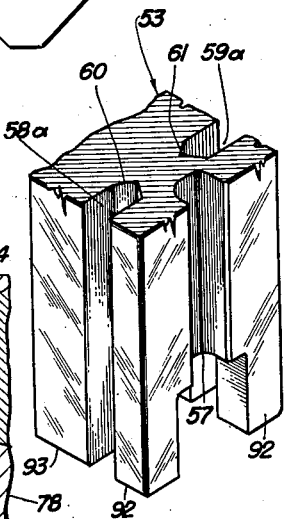

Fig. 15 is a fragmentary perspective of the reciprocating punch containing the parting or severing portion and the notch-cutting portion.

Figure 16:
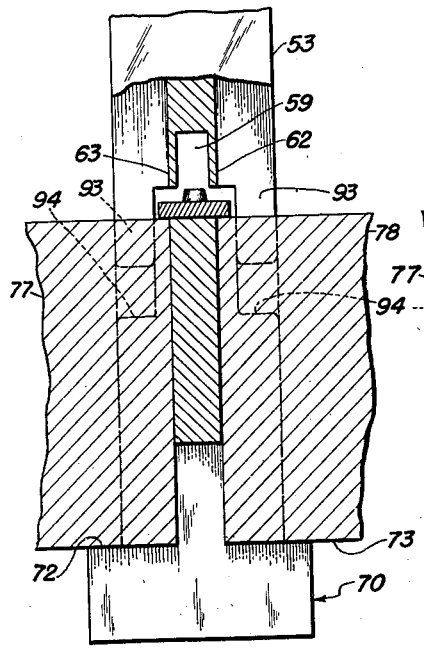

Fig. 16 is a fragmentary vertical section taken substantially along line 16—16 of Fig. 19, showing the punch in its raised condition and the wire strip operatively in place.

Figure 17:
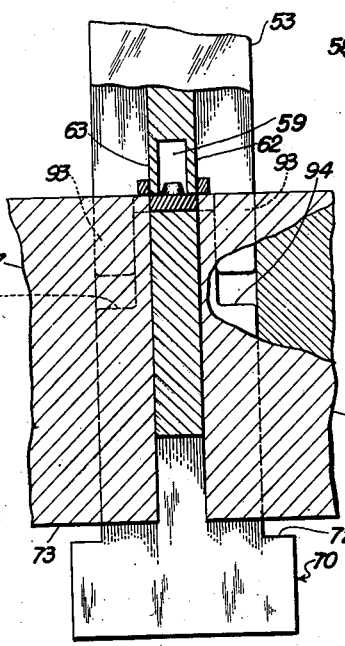

Fig. 17 is a view substantially like Fig. 16, but showing the punch and pressure pad in their lowered position, with the lateral notch portions cut off.

Fig. 18 is a view like Fig. 13, but showing the punches and pressure pad in their lowered positions, substantially in the position of Fig. 17.

Fig. 19 is a plan view of the apparatus of my invention showing the pressure pad and die portions thereof, looking generally downwardly in the direction of arrows 19—19 of Fig. 13.

Fig. 20 is a perspective view of the pressure pad member and dies associated therewith.

Fig. 21 is a perspective view of one of the two cooperative blocks associated with the bottom of the pressure pad housing, in slidable engagement with the pressure pad.

Fig. 22 is a perspective view of the front plate of the machine containing a pilot and a vertical arcuate groove for the bead of the upwardly moving tape.

Fig. 23 is a perspective view of the male die for forming the cavity in the wire strip.

Fig. 24 is an enlarged elevation, partly in section, illustrating the coacting die members producing the cavity and projection of a wire strip in the machine, this figure showing a preferred form of female die in the upper punch for facilely producing the embossed portion of the strip.

Fig. 25 is a plan view, with portions broken away for clarity, of the apparatus of my invention, showing various actuating components.

Fig. 26 is a section of Fig. 25, taken substantially along line 26—26 a thereof.

Fig. 27 is a somewhat enlarged fragmentary elevation of the upper part of the punch housing and tape feeding and braking mechanism, looking generally in the direction of line 27—27 of Fig. 25.

Figure 28:
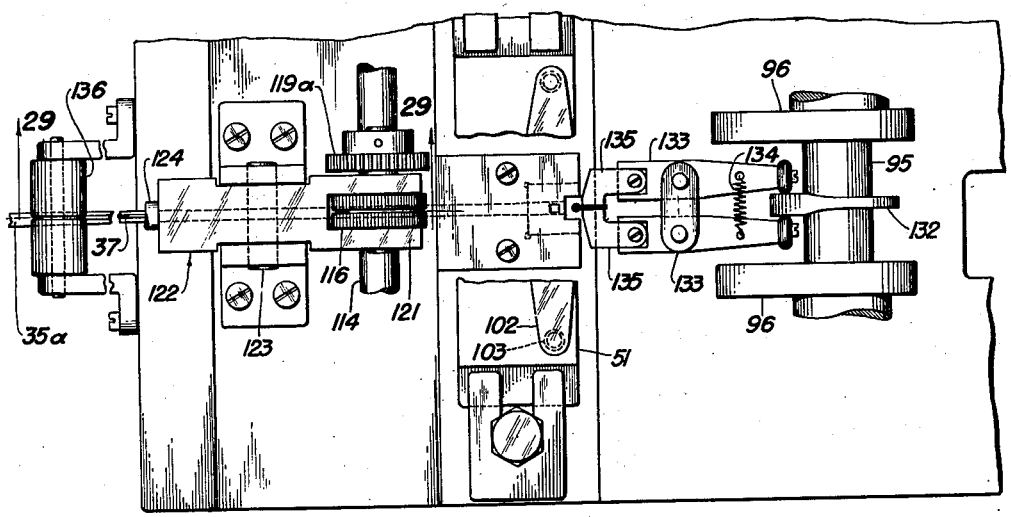

Fig. 28 is another fragmentary plan view of the apparatus of my invention, at right angles with respect to Fig. 25 and somewhat enlarged, showing the main shaft and cams operated thereby, to actuate the clinching arms, and a fragment of the punch housing and the wire feeding mechanism.

Figure 29:
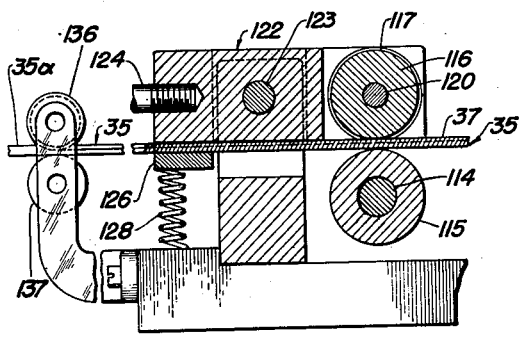

Fig. 29 is a fragmentary section of the wire feed mechanism and release handle therefor, taken substantially along line 29—29 of Fig. 28.

Figure 30:
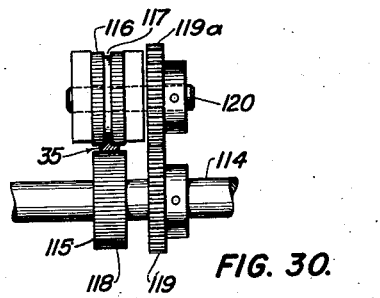

Fig. 30 is an end view of Fig. 29, and

Figure 31:
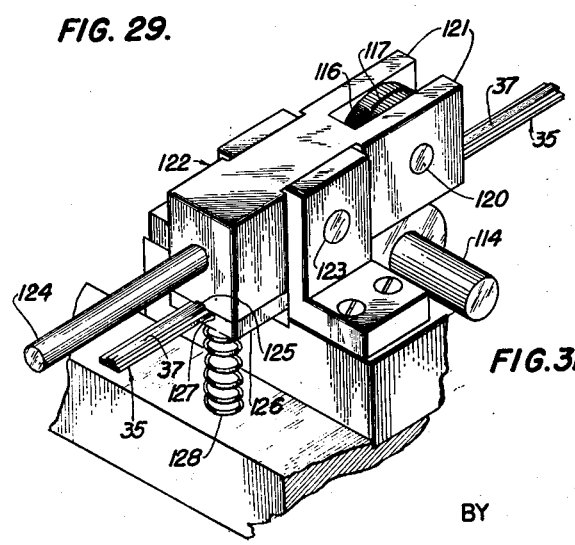

Fig. 31 is a perspective view of the device of Figs. 29 and 30.

In the preferred form of my invention illustrated in the drawings, Figures 1 to 6 show a strip wherein certain operations have been performed by a punch in cooperation with coacting dies. Starting with a flat or round wire stock, a preliminary wire forming operation is performed, as will more clearly hereinafter be described, to produce the wire strip 35 (Fig. 2), containing a flat base 36 and a medial raised portion 37. The conversion of a conventional flat or round stock wire to the form illustrated can be accomplished by any conventional method; but, as will hereinafter be shown, coacting rollers to produce the strip 35 may, within the contemplation of this invention, be employed in conjunction with the feeding and forming mechanisms constituting the apparatus of my invention.

By the method of my invention, a single stroke produces the embossed portion 38, the cutting out of the notches 39, and the severing of the foremost portion 40 along arcuate (dot-dash) line 41. The punch and die components are so spaced that there is an interval of several embossed portions between the rearmost portion 38 and the lateral notches 39, the latter being preferably directly behind the foremost notches 42. The severing operation produces the element 43, with conventional jaws 44 which, when clinched against the tape 45 (Figs. 10 and 11), will embrace the beaded portion 46 in known manner, thereby producing a fastener section like that shown in Fig. 12.

Due to the raised medial portion 37, it has been found that sufficient material is provided to enable relatively deep cavities 47 to be formed in the wire, with correspondingly relatively high projections 48. This enables a firm interlocking engagement between the cooperating fastener elements, and it has been found that such interlocking engagement is considerably more secure and positive than is possible with the smaller cavities and projections resulting from rolling or other conventional methods of producing a preliminary wire strip or embyro elements. Furthermore, as will more clearly hereinafter appear, since the embossing operation that produces the cavities and projections are performed by coacting punch and die members, the edges of the complementary locking portions of the fastener elements are sharper and more closely fitted than in the case of rolled embossed portions.

Although it has long been recognized that deep cavities 47 are advantageous, it has heretofore been found ineffective to employ rolling means to obtain the desired depth; and it has similarly been found to be impracticable to employ conventional punch and die means therefor, since the material employed for fastener elements will not normally stand the strain or stretch to produce cavities and projections such as are obtainable with my method. The additional material comprising the medial raised portion 37 in the T-shaped strip 35 enables relatively large cavities 47 and projections 48 to be made, as aforesaid. The common danger of "air-lock," resulting from too deep a stroke within relatively thin material, has been found to be entirely eliminated by employing a strip like wire 35 above described. Also, as will hereinafter be set forth in greater detail, the medial raised portion 37 permits the employment of a female punch having a recess 49 (Fig. 24) permitting freedom of expansion of the pressed-out metal of projection 48a.

Because of the shape of the cavities and projections 47 and 48, respectively, and the general configuration of strip 35, as well as the method of producing same, it has been ascertained that production speeds can be greater than with conventional methods, greater strokes can be employed in the punch mechanism, and more effective and secure interlocking produced with the finished slide fastener products.

In the preferred method of fabricating slide fasteners according to my invention, I employ a reciprocating punch mechanism 50 movable within a punch housing 51. The said punch mechanism comprises the punch holder 51a and two punch components, the embossing member 52 and the notch-cutting and severing member 53, operated by reciprocating means to be hereinafter described.

Member 52 contains the recessed female punch portion 54, which is adapted to cooperate with the stationary male die member 55 in the base 56 of the machine, to form the cavities and projections 47 and 48 of the slide fastener elements above described.

The punch member 53 is set forwardly of member 52 and contains the arcuate cutting portion 57 proportioned to produce the cut indicated by the dot-dash curve 41 of Fig. 1, there being an upwardly and rearwardly sloping central wall 58 to leave a recess 59 therebehind. The lateral sides of punch member 53 contain the opposite channels 58a and 59a, terminating in V-shaped recesses 60 and 61. The lowermost edges 62 and 63 of said V-shaped recesses 60 and 61, respectively, constitute the cutting edges for removing excess material from the lateral sides of the strip to form the notches 39 (Fig. 1). Extending into the channels 58a and 59a are the guides 64 and 65 (Fig. 14), with which the punch member 53 is slidably engageable—the said guides being parts of the clamps 66 and 67, in threaded engagement with the bolts 68, disposed within the punch holder 51a—whereby said clamps 66 are rigidly maintained in place with respect to the holder and the punch mechanism 50.

The said base 56 of the apparatus (Figs. 13, 18 and 19) contains the die block 69 containing the upwardly projecting male die element 55 cooperating with recess 54 in punch member 52, as aforesaid. Slidably disposed within base 56 is the pressure pad 70, a perspective view of which is clearly shown in Fig. 20. This member is normally urged upwardly by spring 71 to an uppermost position, shown in Fig. 16, in which the shoulders 72 limit its upward movement when it engages the bottom surface 73 of base 56. Said pressure pad also contains the arcuate recess 74 in vertical alignment with the corresponding arcuate portion 57 of the punch 53. The V-shaped lateral grooves 75 and 76 are adapted to cooperate with the corresponding V-shaped portions 60 and 61 of the upper punch member 53, in obvious manner.

The blocks 77 and 78 (shown in perspective in Fig. 21) contain the guide walls 79 extending into the V-shaped grooves 75 and 76, as shown in Fig. 19, thereby maintaining the pressure pad in proper slidable relation with respect to the base 56 and the die members associated therewith.

Disposed forwardly of the pressure pad and blocks 77 and 78 is the front plate 80 (shown in perspective in Fig. 22), containing an upper surface 82a in the same plane as the upper surface 82 of the pressure pad 70 when it is in its upper operative position. On the inner face of plate 80 is the vertical rib 81 of arcuate configuration and proportioned to fit within the arcuate recess 74 in the pressure pad 70, as shown in Fig. 19. At the upper surface of said rib 81 in the upwardly extending pilot 83, preferably about one-third the height of the projections 48 of strip 35, the inner surface 84 thereof being sloped and curved so as to permit the foremost portion of strip 35 to ride and remain thereover with cavity 47 enveloping the pilot. The spacer blocks 85 and 86 (Fig. 19) are disposed in front of plate 80 and are spaced apart to permit the tape 45 to pass therebetween. The beaded portion 46 of the tape is disposed within the vertical arcuate recess 87 at the front of the plate 80, so that during the operative movement of tape 45, as will in greater detail hereinafter be described, the beaded portion will slidably move upwardly within recess 87. The clamps 88 and 89, secured to base 56 by studs 90, have inwardly protruding portions 91, which engage the blocks 85 and 86 and hold them together with the plate 80 and other components of base 56, in proper relative positions.

In the operation of this device, the wire strip 35 is fed, in a manner to be hereinafter described, over the base 56, and forwardly, the feeding action being intermittent and in timed relation with the operation of the punch and tape feeding mechanisms.

As will be seen from Fig. 13, when the punch members 52 and 53 are in their raised position, the pressure pad 70 is also in its raised position, and the wire strip 35 rests upon die element 55 and the upper surface 82 of the pressure pad 70. The foremost portion 40 of the strip has its cavity disposed over the pilot 83, as aforesaid, this position being assumed by virtue of the fact that during the forward feeding movement of strip 35, the said foremost portion thereof rides over the sloping wall 84 of pilot 83, and stays thereover. In this position, the jaws 44 protrude forwardly and flank the arcuate recess 87 of plate 80.

It will be observed that upon a downward operative stroke of punch members 52 and 53, the pressure applied thereby is transmitted through the strip 35 to the pressure pad 70. This causes both the strip and pressure pad to move downwardly against the action of spring 71; and since the coacting punch and die elements 54 and 55 have formed an embossed portion in the strip 35, the entire strip will be depressed to the position shown in Figs. 17 and 18.

It will be further observed that the punch member 53 has downwardly extending heels 92 and 93. These embrace and are in slidable engagement with the adjacent lateral sides of the upper portion of the pressure pad 70, but are above and never in engagement with the intermediate shoulders 94 of the pressure pad, even when the punch 53 is in its lowest position (Fig. 17). This assures freedom of action of the foremost portion 40 of the wire strip 35, and enables it properly to settle itself over the pilot 83.

The actuating means for operatively moving the punch mechanism and feeding the wire and tape are disclosed in Figs. 25 to 31. A main shaft 95, actuated by any known means, has mounted thereover the two cams 96 (Figs. 25 and 28). These cams are in engagement with the punch actuating arm 97 pivotally mounted at 98, so as to cause oscillations of said arm. Extending forwardly from said arm 97 is the actuator 99, through which extends the stud 100 adjustably held in position by nut 101. The lower extremity of stud 100 is in engagement with the beam 102 urged upwardly by the springs 103, mounted within the upper portion of the punch housing 51. Said beam is attached to punch mechanism 50, the details being omitted inasmuch as they are well understood by those skilled in the art. It is thus obvious that an oscillation of arm 97 will cause a corresponding reciprocation of beam 102, and corresponding reciprocating operative strokes of said punch members.

Operatively associated with the main shaft is shaft 105 upon which are mounted the eccentrics 106 and 107, the former being operatively associated with the wire feed pawl 108 and the latter with the tape feed pawl 109. It is apparent that upon an operative rotation of eccentrics 106 and 107 in known manner, the pawls 108 and 109 will be moved forwardly and rearwardly, the total operative movement of the pawls being dependent upon the throw of the respective eccentrics. Pawl 108 is urged against ratchet wheel 110 by the spring 111, and pawl 109 is urged against ratchet wheel 112 by spring 113.

Upon each operative movement of pawl 108, the ratchet wheel 110 will be moved forwardly a distance equal to the pitch of one tooth. This will cause intermittent rotary movements of the shaft 114 upon which wheel 110 is mounted. Affixed to said shaft 114 is the roller 115, which cooperates with the roller 116 thereabove (Fig. 29), said last mentioned roller containing a peripheral groove 117 therein to accommodate the medial raised portion 37 of the wire stock 35. To effect a positive feeding motion, the surface 118 of the feed roller 115 is knurled; and the shaft 114 is provided with a gear 119 in engagement with gear 119a of shaft 120, upon which the upper roller 116 is mounted.

The upper roller 116 is disposed between the bifurcated walls 121 of the block 122, the shaft 120 of upper roller 116 being rotatably mounted within said bifurcated portions. The block 122 is pivotally mounted at 123, and contains a rearwardly extending handle 124 for manual manipulation. The underside of block 122 contains a recessed groove 125 to slidably accommodate the raised portion 37 of the wire 35. Below the block 122 is a base member 126, with a groove 127 in longitudinal registry with groove 125 and adapted slidably to accommodate the raised portion 37 of the wire 35. A spring 128 exerts upward pressure upon base 126, whereby the upper roll 116 is yieldably urged downwardly against the wire strip 35 and towards the lower roller 115.

The arrangement hence is such that intermittent operative movements of wire feed shaft 114 will cause the wire strip 35 to move forwardly intermittently into the apparatus. The frictional engagement of the rollers 115 and 116 with the wire stock 35 causes a brake action and prevents over-feeding. Should it be desired to release the wire 35 from the pressure exerted thereupon by rolls 115 and 116, the handle 124 is depressed against the action of spring 128, thereby elevating roller 116 and in this manner freeing the wire strip 35.

The main brake mechanism to prevent overfeeding of the wire is the brake shoe 150 (Figures 25 and 26) slidably disposed within housing 151 and urged by spring 152 against the drum 153 affixed to shaft 114, the nut 154 on stud 155 being manipulable for adjusting the frictional engagement of the brake shoe and drum. The arrangement is such as to permit a rotation of shaft 114 for feeding the wire, and yet prevent an overfeed due to the speed of rotation.

The tape feeding pawl 109 similarly actuates the ratchet wheel 112 in the manner aforesaid. As will be seen from Fig. 25, ratchet wheel 112 is connected to bevel gear 129 which is in engagement with gear 130 operatively connected to the knurled tape feeding drum 131. Intermittent rotary movements of ratchet wheel 112 thus cause corresponding rotary movements of the drum 131 to cause operative movements of the tape 45 towards an outlet portion not shown (see also Fig. 27).

Since the pawls 108 and 109 derive their operative movements from eccentrics mounted on one shaft, it is apparent that they both will perform their operative functions in timed relation with respect to each other and the actuating shaft 105, and since such shaft is associated, as aforesaid, with the cams 96 (on the main shaft), these operating the punch members, it is evident that the pawls 108 and 109, and consequently the wire and tape feeds, operate in predetermined timed relation with the punch members.

It will also be observed (Fig. 28) that the said main shaft 95 has mounted thereover a cam 132, this being of conventional construction and proportioned to cause the pivotally mounted arms 133 to move outwardly against the action of spring 134 and thereby to bring clinching elements 135 into coactive clinching engagement with the jaws of the foremost attached element embracing the tape 45, all in known manner. It is thus apparent that all the operations are performed in predetermined synchronized and timed relation.

As shown in Figs. 28 and 29, the raw wire stock 35a is fed to rollers 136 and 137 to form in said stock the medially raised portion 37. The formed wire 35 is pulled through the rollers 136 and 137 by the action of the aforesaid rollers 115 and 116.

In order to prevent an over-feeding of the tape 45, a brake mechanism is employed (Fig. 27). This comprises a brake block 138 with a lower arcuate surface 139 in slidable engagement with the tape 45 as it is being moved by drum 131. In other words, surface 139 frictionally engages the tape 45 and yieldably urges it, by the action of spring 141, against the surface of the drum, so that there is a constant braking action on the drum 131 and tape, to prevent an over-feeding. The brake block 138 slidably moves within housing 140 which also contains the spring 141. The block 138 has connected thereto the rod 142 which extends through the cam block 144a to which is attached the downwardly inclined handle 144. The pin 143 extends transversely through the rod 142 and block 144a, so that when the handle 144 is raised, the block 144a will be tilted upwardly, to elevate the pin 143, whereby rod 142 together with brake block 138 will be elevated against the action of spring 141. This will release the pressure upon the tape 45, whenever that may be required.

From the above description, it is apparent that the method and apparatus of my invention makes possible the accomplishment of the objectives hereinabove referred to.

With respect to the tension in the tape 45, it will be observed that the tape is held between the clinching members 135 (during their clinching operation) and the coactive portions of the brake block 138 and tape drum 131, thereabove. The feeding pull that is applied to the tape need be no greater than that required to move the tape within the vertical recess 87 in plate 80 and past the brake block 138. Since the said brake block 138 aids in preventing an overfeeding or excess of movement of the moving tape 45, there is no need to employ the expedient of tensioning the tape to hold it against excessive movement. Hence, there is no need here to employ tape of as great a tensile strength as that which is necessary when tensioning means are applied to the tape in a conventional device. And furthermore, as aforesaid, there is no need to make adjustments in the feeding mechanism to compensate for different degrees of stretchability of tape fabric, as is the case in those conventional machines where the tensioning expedient is employed to prevent over-feeds.

It is also important to note that the elimination of tension in the tape also permits greater tape speeds, since it is known that such tensions have a retarding effect on the speed. Hence greater production is possible with my apparatus.

The use of a wire formed into a short T-shape with a raised medial portion gives the advantage, as aforesaid, of a greater depth of interlocking elements. However, this raised medial portion results in still a further important advantage, in that it provides sufficient material to prevent an undue stretching of the wire during the embossing or cavity-forming operation. Indeed, the excess material at the center of the wire permits the employment of a female punch like that shown in Fig. 24, in which the punch cavity is so proportioned as to leave a space 49 between the rear wall thereof and the raised protuberance 48a in the wire. In the preferred construction shown in said figure, the rear wall 146 is vertical and the rear portion 147 of the top or roof of the cavity is horizontal or at right angles to wall 146. This provides the space 49 and prevents a constriction of protuberance 48a, such as occurs with conventional female punches or dies, proportioned to the exact configuration of the required protuberance. This construction has been employed over a considerable period of time, and it has been found that not only are efficient slide elements produced, but also that there are no "air-lock" effects, as generally occurs when relatively thin material must be stretched over a male punch or die, with no clearance such as is provided by space 49.

In the event it is desired to adjust the machine for producing fastener elements of different widths and pitches, all that need be done is to change a few parts, to wit, the punch members 52 and 53 and coacting dies, the tape and wire feed pawls 108 and 109 and associated parts, possibly the plate 30, and of course the clinching members 135. These changes are simple to make and can be effected quickly, particularly where interchangeable parts are provided for in advance. This arrangement is hence considerably more flexible than most known conventional machines, particularly those producing embryo elements on wire strips by rolling operations.

In the above description, the invention has been disclosed merely by way of example and in preferred manner; but obviously many variations and modifications may be made therein which will still be comprised within its spirit. It is to be understood, therefore, that the invention is not limited to any specific form or manner of practicing same, except insofar as such limitations are specified in the appended claim.

I claim:

An apparatus for forming separable fastener elements from strip stock having a flat base and a raised portion comprising a press including male and female dies, and a feeding mechanism for feeding said strip stock to said male and female dies, said male die being substantially rectangular in shape across its face and disposed transversely of said strip stock to form a substantially rectangular cavity in said flat base, said female die being complementary to said male die to form a complementary projection in said raised portion of said strip stock opposite said cavity, said feeding mechanism comprising coacting rollers adapted to frictionally engage said strip stock, one of said rollers being provided with a peripheral groove proportioned to receive therethrough said raised portion of said strip stock.

HENRY KAUFMANN.

REFERENCES CITED

The following references are of record in the file of this patent:

UNITED STATES PATENTS

| Number | Name | Date |
| --- | --- | --- |
| 355,512 | Deering | Jan. 4, 1887 |
| 496,337 | Churchward | Apr. 25, 1893 |
| 607,597 | Blenkner | July 19, 1898 |
| 1,368,565 | Limont | Feb. 15, 1921 |
| 1,662,332 | Pugh | Mar. 13, 1928 |
| 1,972,329 | Byerlein | Sept. 4, 1934 |
| 2,050,999 | Gilmore | Aug. 11, 1936 |
| 2,052,306 | Kelleher | Aug. 25, 1936 |
| 2,069,429 | Ulrich | Feb. 2, 1937 |
| 2,135,717 | Knoff | Nov. 8, 1938 |
| 2,245,031 | Gottlieb | June 10, 1941 |
| 2,299,606 | Wintritz | Oct. 20, 1942 |
| 2,366,948 | Winterhalter | Jan. 9, 1945 |
| 2,370,380 | Ulrich | Feb. 27, 1945 |
| 2,437,793 | Silberman | Mar. 16, 1948 |